United States Patent
Takano et al.

[19]

[11] Patent Number: 5,881,167
[45] Date of Patent: Mar. 9, 1999

[54] METHOD FOR POSITION RECOGNITION

[75] Inventors: Misuzu Takano, Hirakata; Yoshihiro Itsuzaki, Kashihara; Kinji Horikami, Suita; Masaya Nakao, Moriguchi, all of Japan

[73] Assignee: Matsushita Electric Industrial Co., Ltd., Osaka-fu, Japan

[21] Appl. No.: 780,322

[22] Filed: Jan. 8, 1997

Related U.S. Application Data

[63] Continuation of Ser. No. 283,170, Aug. 3, 1994, abandoned.

[30] Foreign Application Priority Data

Aug. 6, 1993 [JP] Japan ................... 5-195964

[51] Int. Cl.$^6$ ............................................. G06K 9/00
[52] U.S. Cl. ................................... 382/169; 382/270
[58] Field of Search ............................. 382/162, 163, 382/165, 166, 167, 168, 169, 170, 171, 172, 173, 181, 190, 209, 217, 224, 237, 270, 271, 272, 273, 274, 275, 308, 278, 152, 203, 291, 101, 103; 209/584, 900, 701, 939, 587; 348/129

[56] References Cited

U.S. PATENT DOCUMENTS

| | | | |
|---|---|---|---|
| 4,493,420 | 1/1985 | Dennis | 382/199 |
| 4,581,762 | 4/1986 | Lapidus et al. | 382/199 |
| 4,618,989 | 10/1986 | Tsukune et al. | 382/199 |
| 4,736,441 | 4/1988 | Hirose et al. | 382/291 |
| 4,823,394 | 4/1989 | Berkin et al. | 382/291 |
| 4,853,970 | 8/1989 | Ott et al. | 382/199 |
| 4,907,281 | 3/1990 | Hirvonen et al. | 382/291 |
| 4,920,572 | 4/1990 | Sugita et al. | 382/291 |
| 4,969,202 | 11/1990 | Groezinger | 382/199 |
| 5,115,477 | 5/1992 | Groezinger | 382/199 |
| 5,325,443 | 6/1994 | Beatty et al. | 382/147 |

*Primary Examiner*—Leo H. Boudreau
*Assistant Examiner*—Bijan Tadayon
*Attorney, Agent, or Firm*—Wenderoth, Lind & Ponack, L.L.P.

[57] ABSTRACT

A method of position recognition, includes a step of obtaining a gray image by picking up an image of an object by an image pickup device; a step of scanning the gray image by a profile scanning window composed of a plurality of gray-level detection areas which cross a scanning profile corresponding to a profile of the object on the gray image and using to measure a gray-level representative value of an inner-side gray-level detection area and a gray-level representative value of an outer-side gray-level detection area which are inside and outside of the scanning profile; a step of calculating for each gray-level detection area an absolute value of a difference between the measured gray-level representative value of an inner-side gray-level detection area and the measured gray-level representative value of an outer-side gray-level detection area, and a step of detecting a position of the profile scanning window where a number of such gray-level detection areas in which the absolute value is greater than a specified gray-level threshold value becomes a maximum, as a position of the object.

19 Claims, 5 Drawing Sheets

METHOD FOR POSITION RECOGNITION

This application is a Continuation of now abandoned application, Ser. No. 08/283,170, filed Aug. 3, 1994.

BACKGROUND OF THE INVENTION

The present invention relates to a method of position recognition for visual recognition apparatus to be used in robots. More particularly, the invention relates to a method of position recognition by which the position of an object is detected from an image picked up by an image pickup means.

In recent years, a method of position recognition, by which the position of an object is detected from an image picked up by an image pickup device, has been widely used in visual recognition apparatus of robots in various types of production facilities.

From among the methods of position recognition for the above-mentioned application, a conventional example of recognizing the position of a circular object is described below with reference to FIGS. 7 to 9.

FIG. 7 shows the basic arrangement of an apparatus for recognizing the position of a circular object, which employs the conventional method of position recognition. The apparatus of the conventional example basically comprises an image pickup means 21, a binarization means 22, and a labeling center-of-gravity position calculating means 23.

The principle of the conventional method of position recognition is as follows. An image of a circular object picked up by the image pickup means 21 differs in image gray level between the inside and outside of the profile of the circular object. Accordingly, the image picked up by the image pickup means 21 is first binarized by the binarization means 22 according to an image gray-level threshold value. Depending on whether the image is positive or negative, either a higher gray-level image or a lower gray-level image of the binarized image represents the circular object. Therefore, one of the images representing the circular object is interconnected through the common labeling process to form an image representing the circular object and then the position of the center of gravity of the image is calculated by the labeling center-of-gravity position calculating means 23. Thus, the resulting position of center of gravity gives the center-of-gravity position of the circular object.

However, in the above conventional method, when one portion of the background in contact with the circumference of the circular object has a brightness close to that of the circular object, this background portion 25 adds to a binarized image 24 of the circular object as its one portion as shown in FIG. 8, so that a center of gravity 27 of the added-up binarized image is calculated. As a result, the correct center 26 of the circular object could not be determined.

Also, in the above conventional method, for example when the circular object is a lower tapped hole and part of the lower tapped hole is hidden by the peripheral edge of an upper tapped hole, part of the outer periphery of the image 24 of the circular object picked up by the image pickup means 21 is hidden by a background 28 formed by the peripheral edge of the upper tapped hole, as shown in FIG. 9. The result is that a center of gravity 29 of the hidden binarized image is calculated. Thus, the correct center 26 of the circular object could not be determined.

SUMMARY OF THE INVENTION

Accordingly, the object of the present invention is to provide a method of position recognition which allow the position of an object to be recognized correctly and promptly even if part of the profile of the object is unclear in its image.

In accomplishing this and other objects, according to one aspect of the present invention, there is provided a method of position recognition, comprising steps of:

obtaining a gray image by picking up an image of an object by an image pickup device;

scanning the gray image by a profile scanning window composed of a plurality of gray-level detection areas which cross a scanning profile corresponding to a profile of the object on the gray image and using to measure a gray-level representative value of an inner-side gray-level detection area and a gray-level representative value of an outer-side gray-level detection area which are inside and outside of the scanning profile;

calculating for each gray-level detection area an absolute value of a difference between the measured gray-level representative value of an inner-side gray-level detection area and the measured gray-level representative value of an outer-side gray-level detection area; and detecting a position of the profile scanning window where a number of such gray-level detection areas in which the absolute value is greater than a specified gray-level threshold value becomes a maximum, as a position of the object.

BRIEF DESCRIPTION OF THE DRAWINGS

These and other aspects and features of the present invention will become clear from the following description taken in conjunction with the preferred embodiments thereof with reference to the accompanying drawings, in which.

DETAILED DESCRIPTION OF THE PREFERRED EMBODIMENTS

Figure 1:
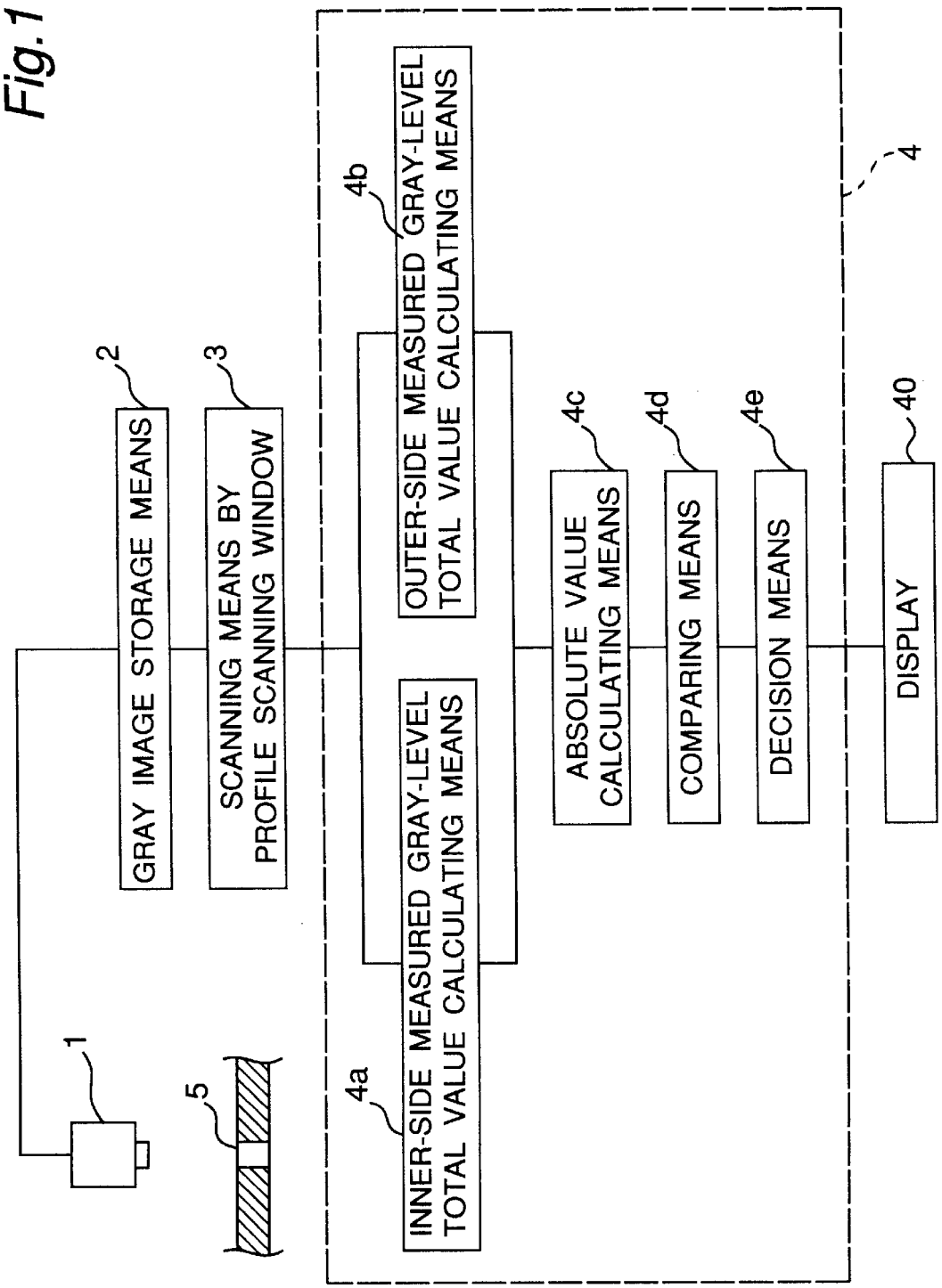
FIG. 1 is a block diagram showing the arrangement of an embodiment of the apparatus for position recognition which employs the method of position recognition of a first embodiment of the present invention.

Before the description of the present invention proceeds, it is to be noted that like parts are designated by like reference numerals throughout the accompanying drawings.

A first embodiment of the present invention is now described with reference to FIGS. 1 through 5 and 10.

FIG. 1 is a block diagram showing the main part of an apparatus for position recognition which employs the method of position recognition of the embodiment of the present invention.

Referring to FIG. 1, in the present embodiment, an image pickup means 1 such as a CCD camera picks up an image of an object 5, issuing an image signal. A gray image storage means 2 stores the image signal as it is converted into gray image data. A scanning means 3 scans the gray image data by utilizing a profile scanning window, which is described later. A position calculation means 4 calculates the position of the object 5 by using the scanning data. The position calculation means 4 includes an inner-side measured gray-level total value calculating means 4a, an outer-side measured gray-level total value calculating means 4b, an absolute value calculating means 4c, a comparing means 4d, and a decision means 4e. The inner-side measured gray-level total value calculating means 4a calculates a total of image densities measured at a specified number of inner-side image gray-level measuring points constituting a whole inner-side gray-level correlation line to determine an inner-side measured gray-level total value as one example of an inner-side gray level representative value. The outer-side measured gray-level total value calculating means 4 calculates a total of image densities measured at a specified number of outer-side image gray-level measuring points constituting a whole outer-side gray-level correlation line to determine an outer-side measured gray-level total value as one example of an outer-side gray level representative value. The specified numbers of the inner-side and outer-side image gray-level measuring points are the same. The absolute value calculating means 4c calculates an absolute value of a difference between the measured gray-level total value of the inner-side gray-level correlation line and the measured gray-level total value of the outer-side gray-level correlation line. The comparing means 4d compares the calculated absolute value with a later-described specified gray-level threshold value has been calculated to be less than a specified number. The decision means 4e decides based on the comparison result of the comparing means 4d whether or not the absolute value is greater than the specified gray-level threshold value. If necessary, a display 40 can be connected to the decision means 4e to display the result.

Figure 2:
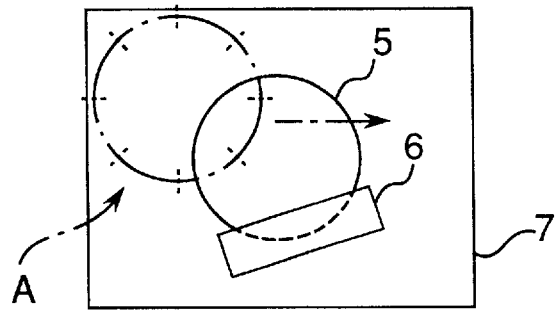
FIG. 2 is a view showing an example of the gray image used in the method of method for position recognition of the first embodiment.

FIG. 2 shows gray image data of FIG. 1, where reference numeral 5 denotes the circular object and numeral 6 denotes a component making up the test subject together with the circular object 5 and overlapping with part of the circular object 5 in the field of the image pickup means 1. This gray image data is scanned within a window 7 that allows the whole circular object 5 to be viewed, and thereby calculated.

Figure 3:
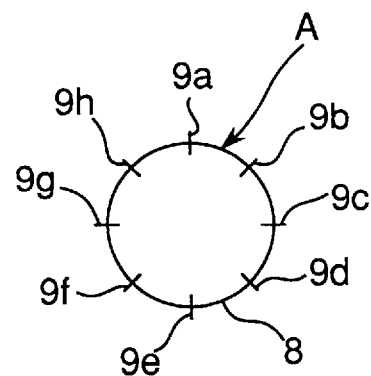
FIG. 3 is a view showing the arrangement of the profile scanning window used in the first embodiment of the present invention.

FIG. 3 shows a profile scanning window A used in the present embodiment, where numeral 8 denotes a circular scanning profile having a diameter equal to that of the image of the circular object 5, the scanning profile corresponding to the boundary between the image portion and the background portion in the image of the circular object 5. Reference numerals 9a to 9h denote a plurality of detection areas to detect a difference between inner-side and outer-side gray level representative values, for example, in the embodiment, a plurality of gray-level correlation lines perpendicular to the scanning profile 8 and serving for measurement of gray-levels of images of inside and outside of the scanning profile 8.

Figure 4:
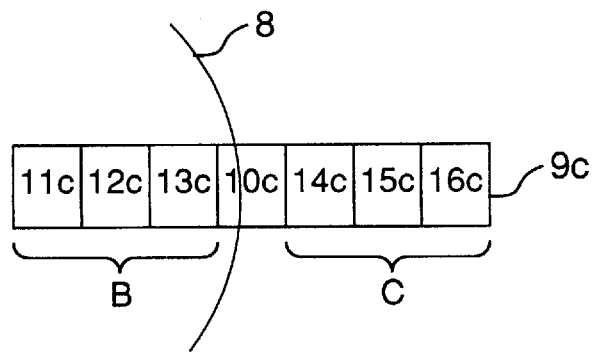
FIG. 4 is a partly detailed view of the profile scanning window of FIG. 3.

FIG. 4 shows details of the line 9c out of the gray-level correlation lines 9a to 9h of the profile scanning window A used in the present embodiment. In the details of the line 9c, 10c denotes the scanning profile position of the gray-level correlation line 9c; 11c, 12c, and 13c are a specified number of, i.e., three, inner-side image gray-level measuring points constituting an inner-side gray-level correlation line B; 14c, 15c, and 16c are a specified number of, i.e., three, outer-side image gray-level measuring points constituting an outer-side gray-level correlation line C.

Figure 5:
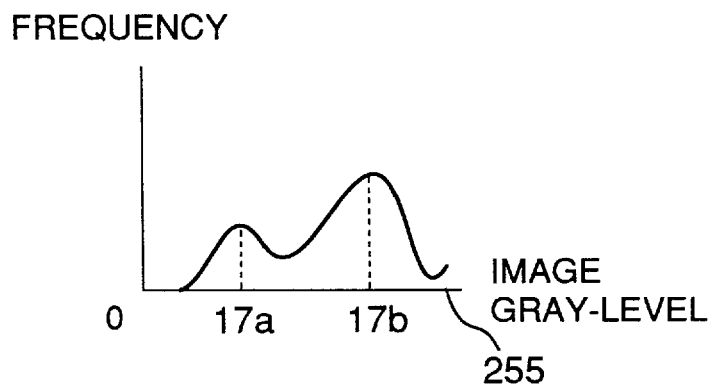
FIG. 5 is a view showing the references for determining the specified gray-level threshold value, inner-side specified total value allowable range, and outer-side specified total value allowable range of the first embodiment.

FIG. 5 is an image gray-level histogram used in determining the specified gray-level threshold value for the absolute value of a difference in gray level between the inside and outside, and the inner- or outer-side specified total value allowable ranges, which are used in the present embodiment. In FIG. 5, the abscissas axis represents image gray level in the range of 0 to 255, and the ordinate axis represents the gray-level value frequency. The point that shows the maximum frequency comes out at two points, 17a and 17b. In the window 7 of FIG. 2, the area of the background portion is usually greater than the area of the circular object 5, so that the minor maximum point 17a represents the inner-side image gray level and the major maximum point 17b represents the outer-side image gray level.

Accordingly, the specified gray-level threshold value for the absolute value of difference in gray level between the inside and outside is one half of the gray-level value resulting from subtracting the gray-level value 17a from the gray-level value 17b. This calculation method is experimentally led out on the basis that if the gray level sharply varied at the boundary of the image of the circular object 5, the specified gray-level threshold value would be greater than above, but actually the gray level will vary with a gray-level gradient. However, whether or not the specified gray-level threshold value is given by one half of the above-subtracted gray-level value may change depending on the number of image gray-level measuring points of the gray-level correlation line. The advantage of such a determination method is that even if the gray-level distribution varies due to variation in illumination or the like, a proper specified gray-level threshold value can be obtained.

Also, the outer-side specified total value allowable range may vary depending on the number of outer-side image gray-level measuring points 14c, 15c, and 16c. When the background image gray-level value is greater than the object image gray-level value, the gray-level value 17b of the image gray-level histogram of FIG. 5 becomes the typical value of the outer-side image gray level, so that the outer-side specified total value allowable range is determined by a function of the gray-level value 17b.

Further, the inner-side specified total value allowable range may vary depending on the number of inner-side image gray-level measuring points 11c, 12c, and 13c. When the object image gray-level value is greater than the background image gray-level value, the gray-level value 17b of the image gray-level histogram of FIG. 5 becomes the typical value of the inner-side image gray level, so that the inner-side specified total value allowable range is determined by a function of the gray-level value 17b.

Next, the operation of position recognition in the first embodiment is described with reference to FIGS. 1 through 5 and 10.

Figure 10:
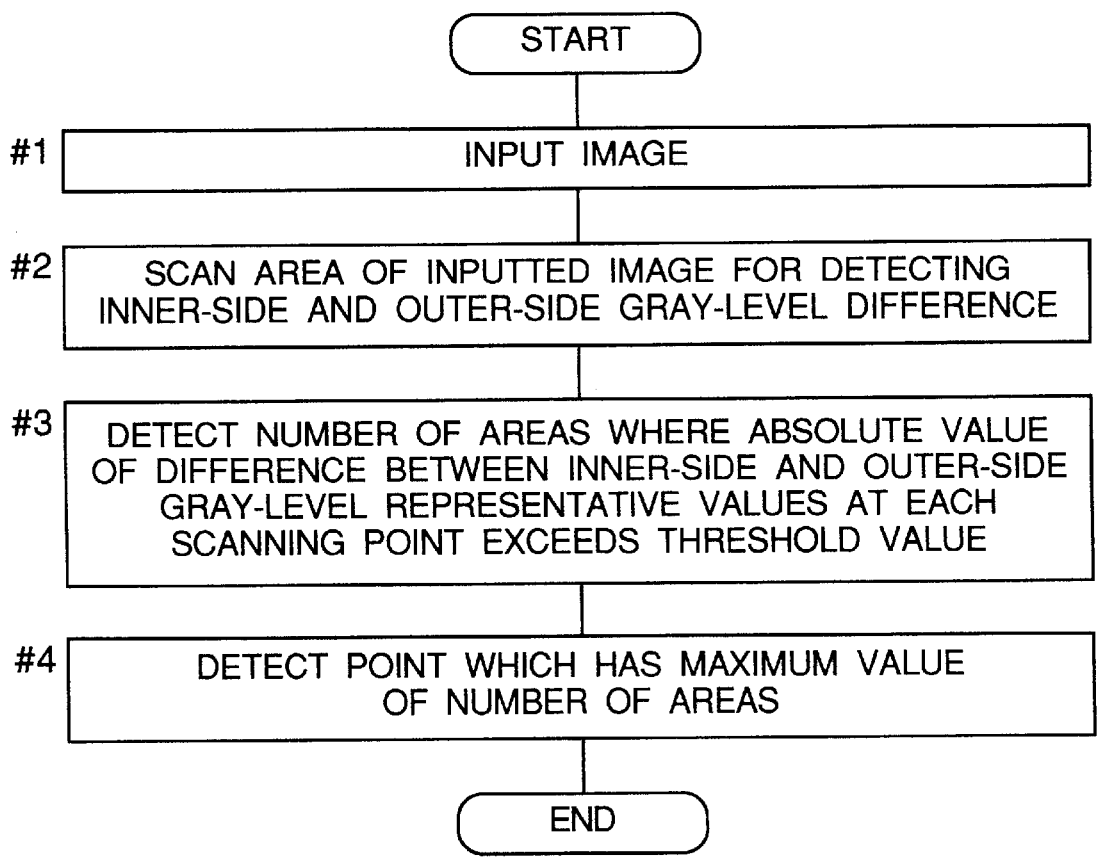
FIG. 10 is a flowchart of the method of the first embodiment.

First, at step #1 in FIG. 10, an image of the test subject including the circular object 5 is picked up by the image pickup means 1 as shown in FIG. 1 so that a gray image in the window 7 is obtained. The resultant gray image in the window 7 is stored in the gray image storage means 2.

The gray image in the window 7 includes the circular object 5 as shown in FIG. 2, and the component 6 of the test subject overlaps a part of the circular object 5.

In this case, the operation of the present embodiment for detecting the position of the circular object is described below.

First, at step #2 in FIG. 10, the scanning means 3 as shown in FIG. 1 begins to scan the gray image in the window 7 as shown in FIG. 2 from its left top to the right by using the profile scanning window A as shown in FIG. 3. Each time the scanning means 3 moves over one pixel, the position calculation means 4 performs the calculation at step #3 in FIG. 10.

However, if the calculation for calculating the position of the circular object 5 is done completely at each scanning position, the scanning time would be so long that the operation would no longer be practical. Accordingly, until the profile scanning window A approaches the position of the circular object 5, only a simple calculation is done to confirm that the profile scanning window A has not approached the circular object 5 yet and the operation moves to the next scanning point.

That is, while the profile scanning window A is largely away from the circular object 5, the inner- or outer-side specified total value allowable range whose determination method has been described in connection to FIG. 5 is first used. That is, in this stage, image gray level values measured at the three inner-side image gray-level measuring points 11c, 12c, and 13c constituting the whole inner-side gray-level correlation line B are totaled to determine the inner-side measured gray-level total value by the inner-side measured gray-level total value calculating means 4a, where a determination is made as to whether or not the resulting total value is within the inner-side specified total value allowable range. For example, when the image gray level values measured at the three inner-side image gray-level measuring points 11c, 12c, and 13c are 30, 35, and 45, the total value as the inner-side gray level representative value is 110 (=30+35+45). Also, image gray level values measured at the three outer-side image gray-level measuring points 14c, 15c, and 16c constituting the whole outer-side gray-level correlation line C are totaled to determine the outer-side measured gray-level total value by the outer-side measured gray-level total value calculating means 4b, where a determination is made as to whether or not the resulting total value is within the outer-side specified total value allowable range. For example, when the image gray level values measured at the three outer-side image gray-level measuring points 14c, 15c, and 16c are 120, 130, and 125, the total value as the outer-side gray level representative value is 375 (=120+ 130+125). Then, if either one of them is unallowable, it is decided that the profile scanning window A is still largely away from the circular object 5, where the calculation at the current scanning position is ended and moved to the next scanning position. In this state, the movement of the scanning position may be over a plurality of pixels instead of one pixel. Further, it may be only in either one side of the outer or inner side.

As the profile scanning window A gradually approaches the circular object 5, the inner-side measured gray-level total value and the outer-side measured gray-level total value come to fall within the inner-side specified total value allowable range and the outer-side specified total value allowable range, respectively. At this point, the method of calculation is changed as described below.

When the profile scanning window A is decided to have gradually approached the circular object 5, the specified gray-level threshold value whose determination method has been described in connection to FIG. 5 is used. That is, in this stage, at a time point when the number of such gray-level correlation lines that the absolute value of a difference between the measured gray-level total value of the inner-side gray-level correlation line B and the measured gray-level total value of the outer-side gray-level correlation line C which is calculated by the absolute value calculating means 4c is greater than the specified gray-level threshold value has been calculated to be less than the specified number, the calculation at the current scanning position is halted and moved to the next scanning position. The reason that this calculation method is executed is as follows. That is, in the case where the circular object 5 is perfectly circular, the number of such gray-level correlation lines that the absolute value of the aforementioned difference is greater than the specified gray-level threshold value equals to the number of all the lines at a time point when the profile scanning window A has substantially coincided with the circular object 5. Also, in the case where the circular object 5 lacks part of the circular shape, at a time point when the profile scanning window A has substantially coincided with the circular object 5, the number of lines equals to one resulting from subtracting the number of gray-level correlation lines corresponding to the lacking part from the number of all the lines. Therefore, if the specified number of lines is a number resulting from subtracting 1 to 2 from the number of such gray-level correlation lines that the absolute value of the aforementioned difference is greater than the specified gray-level threshold value at the time point when the profile scanning window A has substantially coincided with the circular object 5, then it proves that the profile scanning window A is not coincident with the circular object 5 at the current scanning position at a time point when the number of such gray-level correlation lines that the absolute value of the aforementioned difference is greater than the specified gray-level threshold value is less than the specified number of lines. As a result, the calculation at the current scanning position is halted and moved to the next scanning position. In the concrete example of the inner-side total value is 110 and the outer-side total value is 375, the absolute value of the difference between them is 265 (=|110− 375|). If the threshold value is 100, the absolute value is greater than the threshold value, the detection area is added to the number of the detection areas.

When the number of such gray-level correlation lines that the absolute value of the aforementioned difference is greater than the specified gray-level threshold value becomes greater than the specified number of lines, the profile scanning window A has come up to close proximity to the circular object 5. From this point on, regular calculation for recognizing the position of the circular object 5 is performed.

More specifically, the absolute value of difference between a measured gray-level total value of the inner-side gray-level correlation line B composed of a specified number of inner-side image gray-level measuring points and a measured gray-level total value of the outer-side gray-level correlation line C composed of a specified number of outer-side image gray-level measuring points is calculated for each gray-level correlation line. Then, a position of the profile scanning window A where the number of such gray-level correlation lines that the absolute value is greater than the specified gray-level threshold value becomes a maximum is detected as the position of the object 5 at step #4 in FIG. 10.

Through the above steps, the position of the circular object 5 can be recognized promptly and correctly from the test subject.

In this method, if the threshold value is determined from the image gray-level distribution in each case, correct position recognition can be achieved even if some variation of illumination is involved.

Now a second embodiment of the present invention is described with reference to FIG. 6.

Figure 6:
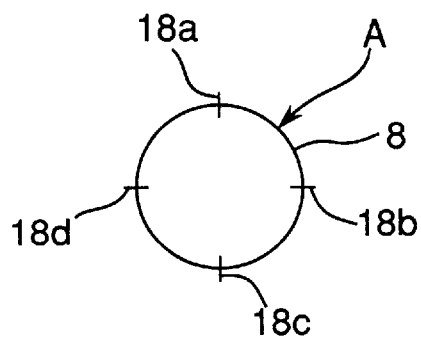
FIG. 6 is a view showing the arrangement of the profile scanning window used in a second embodiment of the present invention.
Figure 7:
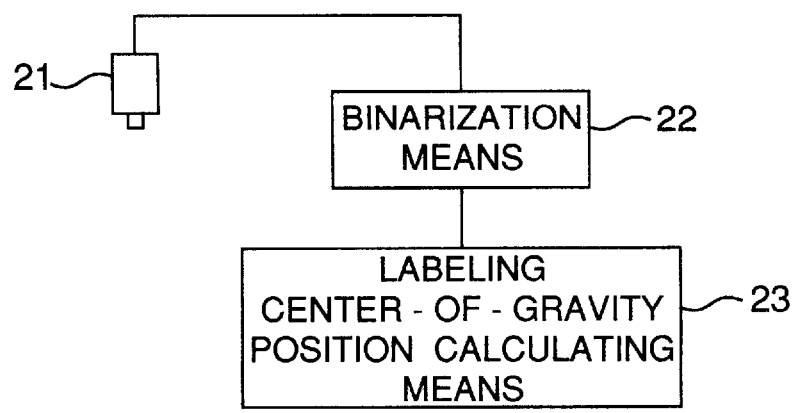
FIG. 7 is a block diagram showing the arrangement of the apparatus for position recognition which employs the conventional method of position recognition.
Figure 8:
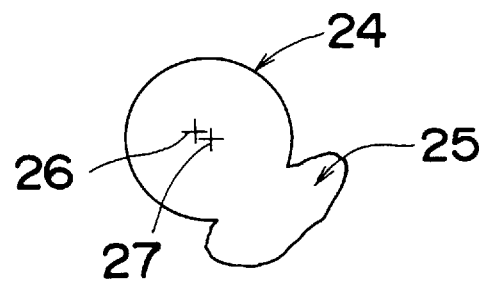
FIG. 8 is a view showing an example of the gray image used in the conventional method of position recognition.
Figure 9:
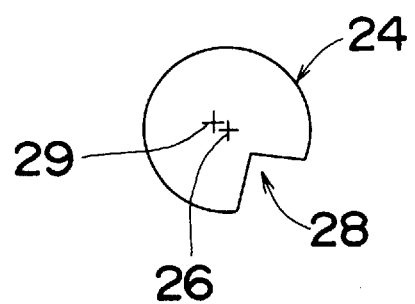
FIG. 9 is a view showing another example of the gray image used in the conventional method of position recognition.

FIG. 6 shows the arrangement of the profile scanning window A used in the second embodiment. The gray-level correlation lines are the four of 18a, 18b, 18c, and 18d spaced at intervals of 90°. The way in which they are used is the same as in the first embodiment, and a description thereof has therefore being omitted.

When the object of the position recognition is a circular object whose whole circumference is invariably clear, a profile scanning window A having such a small number of gray-level correlation lines may be used. As a result, correct, prompt position recognition can be accomplished with higher-speed calculation.

Although in the embodiment, the size and configuration of the scanning profile have the same as those of the profile of the object, the size and/or configuration of the scanning profile can be different from the size and/or configuration of the object.

Moreover, although the profile scanning window is used in the embodiments, only detection areas can be used as the window without the profile.

Furthermore, although the detection area is a correlation line in the embodiments, the detection area is not limited to a line and can be of an arbitrary shape capable of detecting inner-side and outer-side gray level representative values.

It is noted that the specified number of gray-level measuring points of the inner-side gray-level correlation line B and the outer-side gray-level correlation line C of a gray-level correlation line may be set to an arbitrary number equal to or more than 1. When the specified number of gray-level measuring points of the inner-side gray-level correlation line B and the outer-side gray-level correlation line C of a gray-level correlation line equal to 1, the calculation for finding the inner-side and outer-side measured gray-level total values can be omitted.

On the other words, in the embodiments, the gray-level representative value of the inner-side gray-level detection area is a total value of a specified number of inner-side image gray-level measuring points constituting the inner-side gray-level detection area and the gray-level representative value of the outer-side gray-level detection area is a total value of the same number of outer-side image gray-level measuring points constituting the outer-side gray-level detection area as that of the inner-side image gray-level measuring points.

However, the gray-level representative value of the inner-side and outer-side gray-level detection areas are not limited to the total values. For example, the gray-level representative value of the inner-side gray-level detection area can be an average value of a specified number of inner-side image gray-level measuring points constituting the inner-side gray-level detection area and the gray-level representative value of the outer-side gray-level detection area can be an average value of a specified number of outer-side image gray-level measuring points constituting the outer-side gray-level detection area. That is, for example, in FIG. 4, the gray level values of the points 11c and 12c are totaled and divided by two in the inner-side gray-level detection area while the gray level values of the points 14c and 15c are totaled and divided by two in the outer-side gray-level detection area. Alternatively, the gray-level representative value of the inner-side gray-level detection area can be a value selected from inner-side image gray-level measuring points constituting the inner-side gray-level detection area and the gray-level representative value of the outer-side gray-level detection area can be a value selected from outer-side image gray-level measuring points constituting the outer-side gray-level detection area. That is, for example, in FIG. 4, the gray level value of the points 11c is selected in the inner-side gray-level detection area while the gray level value of the point 15c is selected in the outer-side gray-level detection area. In this case, when the profile of the object on the gray image is unclear, or when the size of the object is larger than that of the scanning profile, for example, in FIG. 4, a point 11c or 16c can be selected which is separated away from the point 10c corresponding to the profile of the object by few points.

Although the object has been a circular object in the embodiments, it is not limited to circular shape. The present invention may also be embodied with an object of any arbitrary shape in the same manner as with a circular shape.

The method for position recognition according to the present invention makes it possible to recognize the position of an object promptly and correctly even if part of the profile of a picked-up image of the object is unclear in the image. The method has the following advantages.

According to the method for position recognition of the embodiments of the present invention, a gray image obtained by the image pickup means picking up an image from the object has clear differences in image gray level between the inside and outside of the profile of the image at portions having a clear image profile, and no differences in image gray level between the inside and outside of the profile of the image at portions having an unclear profile. Therefore, when the profile scanning window is coincident with the image of the object, gray-level correlation lines present in portions having a clear profile of the image have greater absolute values of the difference between a measured gray-level total value of the inner-side gray-level correlation line and a measured gray-level total value of the outer-side gray-level correlation line, while gray-level correlation lines present in portions having an unclear profile of the image have smaller absolute values of the difference between a measured gray-level total value of the inner-side gray-level correlation line and a measured gray-level total value of the outer-side gray-level correlation line. Taking advantage of this fact, only such gray-level correlation lines that the absolute value of the aforementioned difference is equal to or more than a specified gray-level threshold value are used as those which can be utilized for the position recognition without errors. Thus, correct position recognition can be accomplished.

Then, according to the method for position recognition of the embodiments of the present invention, an absolute value of difference between a measured gray-level total value of the inner-side gray-level correlation line and a measured gray-level total value of the outer-side gray-level correlation line calculated for each gray-level correlation line can be calculated, and a position of the profile scanning window where the number of such gray-level correlation lines that the absolute value is greater than a specified gray-level threshold value becomes a maximum is detected as the position of the object. Thus, even when the profile of the image of the object is partly unclear, the position of the object can be correctly recognized, as an advantage of the invention.

Also, according to the method for position recognition of the present invention, the specified gray-level threshold value can be determined by referencing the gray level of a maximum point of a gray-level histogram of pixels of the gray image. Thus, the position of the object can be correctly recognized without being affected by the quantity of light of the illumination, as a further advantage.

Further, according to the method for position recognition of the embodiments of the present invention, for prompted scanning of the profile scanning window, the calculation at a scanning position of the profile scanning window can be halted and moved to the next scanning position at a time point when the number of such gray-level correlation lines that the absolute value of difference between a measured gray-level total value of the inner-side gray-level correlation line and a measured gray-level total value of the outer-side gray-level correlation line calculated for each gray-level correlation line is greater than a specified gray-level threshold value has been calculated to be less than a specified number. Referring to the reason of this, the number of gray-level correlation lines enough to attain correct position recognition needs to be equal to or more than a specified number. Also, when the profile of the object is only partly circular and otherwise not, the number of such gray-level correlation lines in which the absolute value of the aforementioned difference is greater than the specified gray-level threshold value becomes a maximum at a position where the profile scanning window is completely coincident with the circular part. Accordingly, the number of gray-level correlation lines which are enough to attain correct position recognition needs to be more than a number slightly smaller than the number of the above maximum. Meanwhile, the calculation of the absolute value of the difference between the measured gray-level total value of the inner-side gray-level correlation line and the measured gray-level total value of the outer-side gray-level correlation line takes time until it is completed. Therefore, at a time point during the calculation when the number of gray-level correlation lines that can be used for position recognition has considered to be less than the specified number, the calculation can be halted and moved to the next scanning position. Thus, the scanning of the profile scanning window can be carried out promptly.

Further, according to the method for position recognition of the embodiments of the present invention, for prompted scanning of the profile scanning window, the calculation at a scanning position of the profile scanning window can be halted and moved to the next scanning position at a time point when, with the background image gray-level value greater than the object image gray-level value, the measured gray-level total value of the whole outer-side gray-level correlation line has been calculated to fall outside an outer-side specified total value allowable range. Referring to the reason of this, when the profile scanning window is located close to the image of the object, the measured gray-level total value due to measurement of the whole outer-side gray-level correlation line corresponds to the outer-side image gray level of the image of the object, so that the measured gray-level total value falls within the outer-side specified total value allowable range determined based on the outer-side image gray level, as a matter of course. Accordingly, if it does not fall within the outer-side specified total value allowable range, the profile scanning window is out of the image of the object. Thus, the calculation can be halted and moved to the next scanning position. This decision by the specified total value allowable range can be done promptly so that the scanning of the profile scanning window can be carried out promptly.

Also, according to the method for position recognition of the embodiments of the present invention, for prompted scanning of the profile scanning window, the calculation at a scanning position of the profile scanning window can be halted and moved to the next scanning position at a time point when, with the object image gray-level value greater than the background image gray-level value, the measured gray-level total value of the whole inner-side gray-level correlation line has been calculated to fall outside an inner-side specified total value allowable range. Referring to the reason of this, when the profile scanning window is located close to the image of the object, the whole inner-side gray-level correlation line corresponds to the inner-side gray level of the image of the object, so that the measured gray-level total value falls within the inner-side specified total value allowable range, as a matter of course. Accordingly, if it does not fall within the inner-side specified total value allowable range, the profile scanning window is out of the image of the object. Thus, the calculation can be halted and moved to the next scanning position. This decision by the specified total value allowable range can be done promptly so that the scanning of the profile scanning window can be carried out promptly.

Still also, according to the method for position recognition of the embodiments of the present invention, the inner-side or outer-side specified total value allowable range can be determined by referencing the gray level of a maximum point of a gray-level histogram of pixels of the gray image. Thus, the position of the object can be correctly recognized without being affected by the quantity of light of the illumination, as a further advantage.

Although the present invention has been fully described in connection with the preferred embodiments thereof with reference to the accompanying drawings, it is to be noted that various changes and modifications are apparent to those skilled in the art. Such changes and modifications are to be understood as being included within the scope of the present invention as defined by the appended claims unless they depart therefrom.

What is claimed is:

1. A method of position recognition, comprising the steps of:

obtaining a gray image by picking up an image of an object by an image pickup device;

scanning the gray image by a profile scanning window composed of a plurality of gray-level detection areas which cross a scanning profile corresponding to a profile of the object on the gray image and using to measure a gray-level representative value of an inner-side gray-level detection area and a gray-level representative value of an outer-side gray-level detection area which are inside and outside of the scanning profile;

calculating for each gray-level detection area an absolute value of a difference between the measured gray-level representative value of an inner-side gray-level detection area and the measured gray-level representative value of an outer-side gray-level detection area; and detecting a position of the profile scanning window where a number of such gray-level detection areas in which the absolute value is greater than a specified gray-level threshold value becomes a maximum, as a position of the object;

wherein the gray-level representative value of the inner-side gray-level detection area is a total value of a specified number of inner-side image gray-level measuring points constituting the inner-side gray-level detection area and the gray-level representative value of the outer-side gray-level detection area is a total value of the same number of outer-side image gray-level detection area as that of the inner side image gray-level measuring points; and wherein the calculation at a scanning position of the profile scanning window is halted and moved to a next scanning position at a time point when the number of such gray-level detection areas that the absolute value of difference between the total value as the measured gray-level representative value of the inner-side gray-level detection area and the total value as the measured gray-level representative value of the level representative value of the outer-side gray-level detection area calculated for each gray-level detection area is greater than the specified gray-level threshold value has been calculated to be less than a specified number.

2. A method of position recognition, comprising the steps of:

obtaining a gray image by picking up an image of an object by an image pickup device;

scanning the gray image by a profile scanning window composed of a plurality of gray-level detection areas which cross a scanning profile corresponding to a profile of the object on the gray image and using to measure a gray-level representative value of an inner-side gray-level detection area and a gray-level representative value of an outer-side gray-level detection area which are inside and outside of the scanning profile;

calculating for each gray-level detection area an absolute value of a difference between the measured gray-level representative value of an inner-side gray-level detection area and the measured gray-level representative value of an outer-side gray-level detection area; and detecting a Position of the profile scanning window where a number of such gray-level detection areas in which the absolute value is greater than a specified gray-level threshold value becomes a maximum, as a position of the object;

wherein the specified gray-level threshold value is determined by referencing a gray level of a maximum point of a gray-level histogram of pixels of the gray image, and wherein the calculation at a scanning position of the profile scanning window is halted and moved to a next scanning position at a time point when the number of such gray-level detection areas that the absolute value of difference between the total value as the measured gray-level representative value of the inner-side gray-level detection area and the total value as the measured gray-level representative value of the outer-side gray-level detection area calculated for each gray-level detection area is greater than the specified gray-level threshold value has been calculated to be less than a specified number.

3. A method of position recognition, comprising the steps of:

obtaining a gray image by picking up an image of an object by an image pickup device;

scanning the gray image by a profile scanning window composed of a plurality of gray-level detection areas which cross a scanning profile corresponding to a profile of the object on the gray image and using to measure a gray-level representative value of an inner-side gray-level detection area and a gray-level representative value of an outer-side gray-level detection area which are inside and outside of the scanning profile;

calculating for each gray-level detection area an absolute value of a difference between the measured gray-level representative value of an inner-side gray-level detection area and the measured gray-level representative value of an outer-side gray-level detection area; and detecting a position of the profile scanning window where a number of such gray-level detection areas in which the absolute value is greater than a specified gray-level threshold value becomes a maximum, as a position of the object;

wherein the gray-level representative value of the inner-side gray-level detection area is a total value of a specified number of inner-side image gray-level measuring points constituting the inner-side gray-level detection area and the gray-level representative value of the outer-side gray-level detection area is a total value of the same number of outer-side image gray-level detection area as that of the inner side image gray-level measuring points; and wherein the calculation at a scanning position of the profile scanning window is halted and moved to a next scanning position at a time point when, with a background image gray-level value greater than an object image gray-level value, the total value of the whole outer-side gray-level detection area has been calculated to fall outside an outer-side specified total value allowable range.

4. A method of position recognition, comprising the steps of:

obtaining a gray image by picking up an image of an object by an image pickup device:

scanning the gray image by a profile scanning window composed of a plurality of gray-level detection areas which cross a scanning profile corresponding to a profile of the object on the gray image and using to measure a gray-level representative value of an inner-side gray-level detection area and a gray-level representative value of an outer-side gray-level detection area which are inside and outside of the scanning profile;

calculating for each gray-level detection area an absolute value of a difference between the measured gray-level representative value of an inner-side gray-level detection area and the measured gray-level representative value of an outer-side gray-level detection area; and detecting a position of the profile scanning window where a number of such gray-level detection areas in which the absolute value is greater than a specified gray-level threshold value becomes a maximum, as a position of the object;

wherein the specified gray-level threshold value is determined by referencing a gray level of a maximum point of a gray-level histogram of pixels of the gray image, and wherein the calculation at a scanning position of the profile scanning window is halted and moved to a next scanning position at a time point when, with a background image gray-level value greater than an object image gray-level value, the total value of the whole outer-side gray-level detection area has been calculated to fall outside an outer-side specified total value allowable range.

5. The method for position recognition according to claim 2, wherein the calculation at a scanning position of the profile scanning window is halted and moved to a next scanning position at a time point when, with a background image gray-level value greater than an object image gray-level value, the total value of the whole outer-side gray-level detection area has been calculated to fall outside an outer-side specified total value allowable range.

6. A method of position recognition, comprising the steps of:

obtaining a gray image by picking up an image of an object by an image pickup device;

scanning the gray image by a profile scanning window composed of a plurality of gray-level detection areas which cross a scanning profile corresponding to a profile of the object on the gray image and using to measure a gray-level representative value of an inner-side gray-level detection area and a gray-level representative value of an outer-side gray-level detection area which are inside and outside of the scanning profile;

calculating for each gray-level detection area an absolute value of a difference between the measured gray-level representative value of an inner-side gray-level detection area and the measured gray-level representative value of an outer-side gray-level detection area; and detecting a position of the profile scanning window where a number of such gray-level detection areas in which the absolute value is greater than a specified gray-level threshold value becomes a maximum, as a position of the object;

wherein the gray-level representative value of the inner-side gray-level detection area is a total value of a specified number of inner-side image gray-level measuring points constituting the inner-side gray-level detection area and the gray-level representative value of the outer-side gray-level detection area is a total value of the same number of outer-side image gray-level detection area as that of the inner side image gray-level measuring points; and wherein the calculation at a scanning position of the profile scanning window is halted and moved to a next scanning position at a time point when, with the object image gray-level value greater than the background image gray-level value, the total value of the whole inner-side gray-level detection area has been calculated to fall outside an inner-side specified total value allowable range.

7. A method of position recognition, comprising the steps of:

obtaining a gray image by picking up an image of an object by an image pickup device;

scanning the gray image by a profile scanning window composed of a plurality of gray-level detection areas which cross a scanning profile corresponding to a profile of the object on the gray image and using to measure a gray-level representative value of an inner-side gray-level detection area and a gray-level representative value of an outer-side gray-level detection area which are inside and outside of the scanning profile;

calculating for each gray-level detection area an absolute value of a difference between the measured gray-level representative value of an inner-side gray-level detection area and the measured gray-level representative value of an outer-side gray-level detection area; and detecting a position of the profile scanning window where a number of such gray-level detection areas in which the absolute value is greater than a specified gray-level threshold value becomes a maximum, as a position of the object;

wherein the specified gray-level threshold value is determined by referencing a gray level of a maximum point of a gray-level histogram of pixels of the gray image, and wherein the calculation at a scanning position of the profile scanning window is halted and moved to a next scanning position at a time point when, with the object image gray-level value greater than the background image gray-level value, the total value of the whole inner-side gray-level detection area has been calculated to fall outside an inner-side specified total value allowable range.

8. The method for position recognition according to claim 1, wherein the calculation at a scanning position of the profile scanning window is halted and moved to a next scanning position at a time point when, with the object image gray-level value greater than the background image gray-level value, the total value of the whole inner-side gray-level detection area has been calculated to fall outside an inner-side specified total value allowable range.

9. The method for position recognition according to claim 5, wherein the calculation at a scanning position of the profile scanning window is halted and moved to a next scanning position at a time point when, with the object image gray-level value greater than the background image gray-level value, the total value of the whole inner-side gray-level detection area has been calculated to fall outside an inner-side specified total value allowable range.

10. The method for position recognition according to claim 5, wherein the outer-side specified total value allowable range is determined by referencing a gray level of a maximum point of a gray-level histogram of pixels of the gray image.

11. The method for position recognition according to claim 9, wherein the inner-side specified total value allowable range is determined by referencing a gray level of a maximum point of a gray-level histogram of pixels of the gray image.

12. The method for position recognition according to claim 10, wherein the detection area is a correlation line.

13. The method for position recognition according to claim 11, wherein the detection area is a correlation line.

14. A method for position recognition, comprising:

obtaining a gray image by picking up an image of an object by an image pickup device;

scanning the gray image by a profile scanning window composed of a plurality of gray-level detection areas which cross a scanning profile corresponding to a profile of the object on the gray image and using the result of the scanning to measure a gray-level representative value of an inner-side gray-level detection area inside the scanning profile and a gray-level representative value of an outer-side gray-level detection area outside the scanning profile;

calculating for each gray-level detection area an absolute value of a difference between the measured gray-level representative value of the inner-side gray-level detection area and the measured gray-level representative value of the outer-side gray-level detection area; and detecting a position of the object to be the position of the profile scanning window having a maximum number of gray-level detection areas in which the absolute value is greater than a specified gray-level threshold value.

15. The method for position recognition according to claim 14, wherein the gray-level representative value of the inner-side gray-level detection area is a total value of a specified number of inner-side image gray-level measuring points constituting the inner-side gray-level detection area and the gray-level representative value of the outer-side gray-level detection area is a total value of the same number of outer-side image gray-level measuring points constituting the outer-side gray-level detection area as that of the inner-side image gray-level measuring points.

16. The method for position recognition according to claim 14, wherein the gray-level representative value of the inner-side gray-level detection area is an average value of a specified number of inner-side image gray-level measuring points constituting the inner-side gray-level detection area and the gray-level representative value of the outer-side gray-level detection area is an average value of a specified number of outer-side image gray-level measuring points constituting the outer-side gray-level detection area.

17. The method for position recognition according to claim 14, wherein the gray-level representative value of the inner-side gray-level detection area is a value selected from inner-side image gray-level measuring points constituting the inner-side gray-level detection area and the gray-level representative value of the outer-side gray-level detection area is a value selected from outer-side image gray-level measuring points constituting the outer-side gray-level detection area.

18. The method for position recognition according to claim 14, wherein the specified gray-level threshold value is determined by referencing a gray level of a maximum point of a gray-level histogram of pixels of the gray image.

19. An apparatus for position recognition, comprising:

an image pickup device for obtaining a gray image by picking up an image of an object;

a scanning means for scanning the gray image by a profile scanning window composed of a plurality of gray-level detection areas which cross a scanning profile corresponding to a profile of the object on the gray image and using the result of the scanning to measure a gray-level representative value of an inner-side gray-level detection area inside the scanning profile and a gray-level representative value of an outer-side gray-level detection area outside the scanning profile;

an absolute value calculating means for calculating, for each gray-level detection area, an absolute value of a difference between the measured gray-level representative value of the inner-side gray-level detection area and the measured gray-level representative value of the outer-side gray-level detection area; and a deciding means for detecting a position of the object to be a position of the profile scanning window having a maximum number of gray-level detection areas in which the absolute value is greater than a specified gray-level threshold value.

* * * * *